J. I. TAYLOR.
CEMENT BLOCK MOLDING APPARATUS.
APPLICATION FILED JAN. 18, 1910.
961,659.
Patented June 14, 1910.
2 SHEETS—SHEET 1.
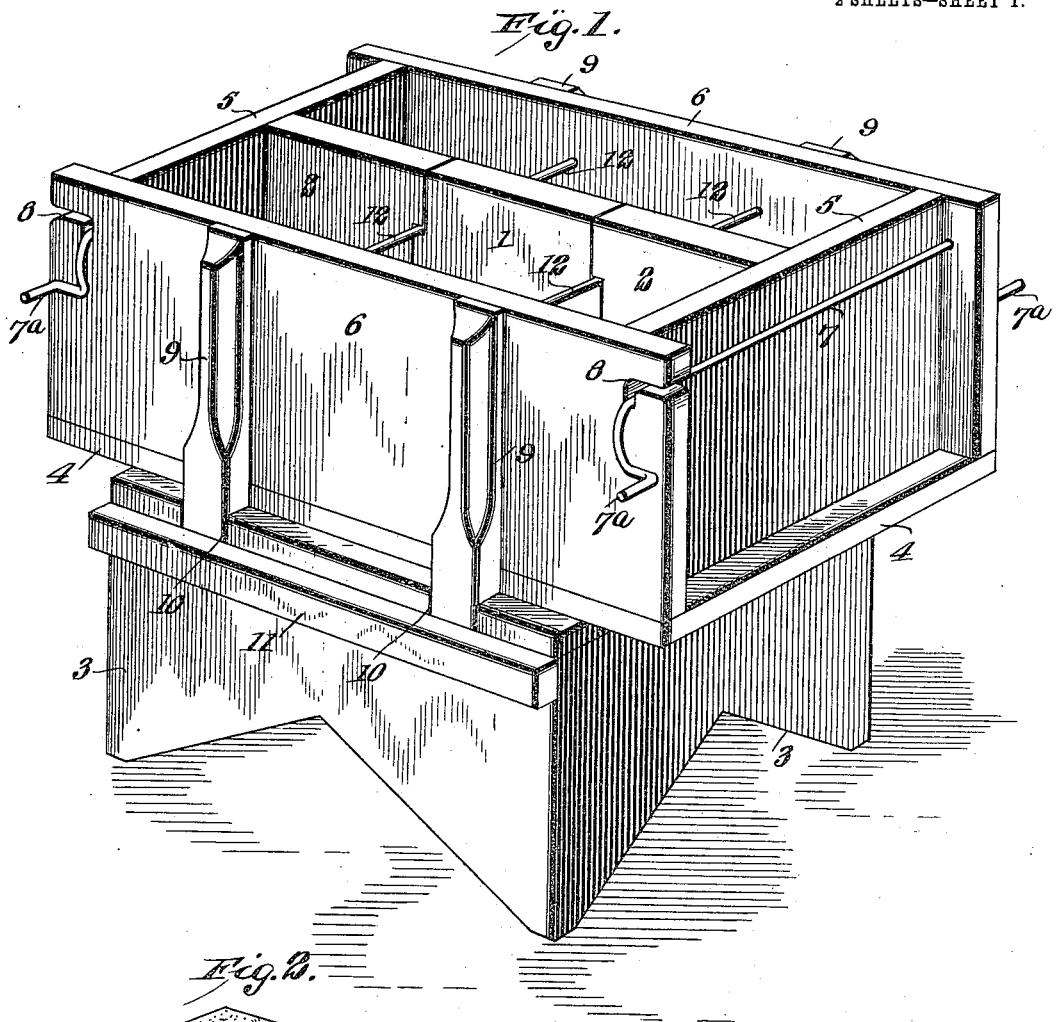
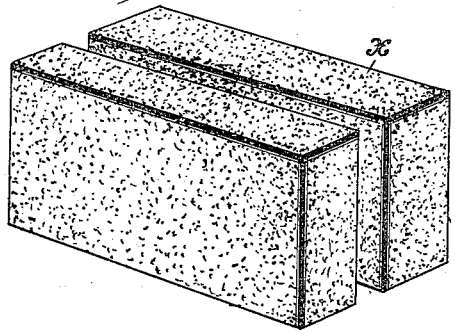
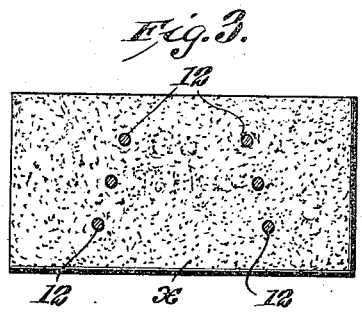
WITNESSES:
INVENTOR
JAMES I. TAYLOR
BY
ATTORNEYS J. I. TAYLOR.
CEMENT BLOCK MOLDING APPARATUS.
APPLICATION FILED JAN. 18, 1910.
961,659.
Patented June 14, 1910.
2 SHEETS—SHEET 2.
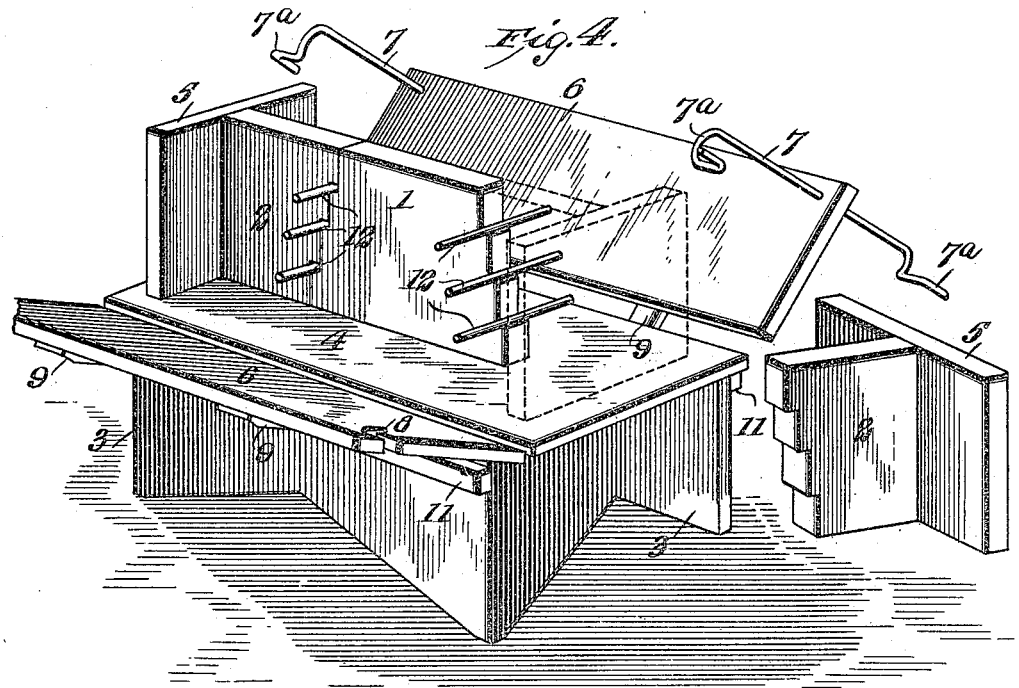
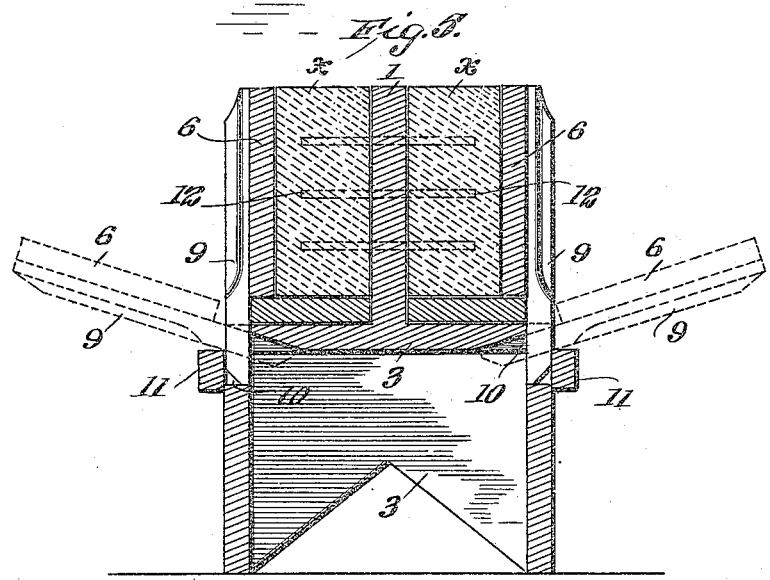
WITNESSES:
INVENTOR
JAMES I. TAYLOR
BY
ATTORNEYS

UNITED STATES PATENT OFFICE.

JAMES I. TAYLOR, OF ROCK RAPIDS, IOWA.

CEMENT-BLOCK-MOLDING APPARATUS.

961,659. Specification of Letters Patent. Patented June 14, 1910.

Application filed January 18, 1910. Serial No. 538,593.

*To all whom it may concern:*

Be it known that I, JAMES I. TAYLOR, a citizen of the United States, and a resident of Rock Rapids, in the county of Lyon and State of Iowa, have invented certain Improvements in Cement-Block-Molding Apparatus, of which the following is a specification.

My invention is an improvement in that class of apparatus for molding cement blocks which are formed of side blocks or portions connected by means of transverse bars or rods.

My invention is embodied in the construction and combination of parts hereinafter described, whereby provision is made for supporting, during the molding operation, the transverse bonds or ties which are embedded in the block when molded.

In the accompanying drawing:—Figure 1 is a perspective view of my improved apparatus in working position. Fig. 2 is a perspective view of the two-part block produced by said apparatus. Fig. 3 is a central longitudinal section of the block. Fig. 4 is a perspective view of the apparatus, showing certain parts detached or adjusted in the position required to effect removal of the molded block. Fig. 5 is a central vertical transverse section of the apparatus, the sides of the mold-box being shown by dotted lines in the position they assume when the molded block is to be removed.

In Fig. 2, the molded cement block X is shown as composed of two longitudinal portions which are separated by a narrow space, and Fig. 3 illustrates the arrangement of the bonding devices consisting of rods or bars, which are arranged in two rows, and extend across the space between the two parts of the block. The arrangement of these bonds or ties is further illustrated in Fig. 5. The space between the two parts of the molded block is formed by means of a core composed of a fixed central part 1 and detachable end parts 2. These are constructed of boards of suitable thickness arranged in alinement, and thus form a continuous vertical core extending through the longitudinal middle of the mold-box. The central core part 1 is fixed in base 3—see Fig. 5. The removable bottom 4 of the mold-box has a slot to receive this fixed core 1, and the latter serves to hold such bottom in due position during the molding operation. The removable core parts 2 are fixed attachments of the ends 5 of the mold-box—see especially Fig. 4. When set in due position for the molding operation, these parts 2 and 5 are supported on the flat bottom 4 of the mold-box, as indicated at the left in Fig. 4.

The sides 6 of the mold-box are supported on the removable bottom 4, when in position for use, and are held in such position by means of spring clamps 7 having curved ends 7ª—see Figs. 1 and 4. These devices are constructed of spring rods, one end of which is pivoted in one of the sides of the mold-box and the other is held in an L-shaped slot 8 formed in the other side. The ends of the rods 7 are curved so as to form spring arms that bear against the sides 6 and hold them against the ends 5 during the molding operation. The rods 7 likewise serve to hold the detachable cores 2 and ends 5 of the mold-box in due working position, as shown in Fig. 1. In other words, the rods 7 prevent the parts 2 and 5 from moving endwise or outward from the fixed core 1. It will be seen that, since the clamping rods 7 are pivoted in one of the sides 6, they constitute attachment of such side, and, when the two sides 6, 6, are brought up into vertical parallel position, shown in Fig. 1, the clamp is easily applied by sliding the free ends into the L-shaped slots 8.

The sides 6 are provided with vertical cleats 9 which are spaced apart horizontally and whose lower ends extend into slots 10 formed in the top angles of the base 3. The said slots 10 are constructed or enlarged in such manner as to allow the lower ends of the cleats to swing inward and upward when it is desired to remove the molded block from the mold-box, the sides 6 of the box being in such case thrown down to the inclined position indicated by dotted lines—Fig. 5—the cleats then resting on bars or other suitable supports 11 which are applied to and extend along the sides of the base 3. The sides 6 are thus held supported out of the way, but may be readily swung back to the vertical position indicated by full lines—Figs. 1 and 5.

In the operation of removing the molded block from the mold-box, the clamping rods 7 are first detached so as to allow the sides 6 to fall over to the inclined position shown by dotted lines, Fig. 5, and then the ends 5 of the box, together with the attached core sections 2, may be withdrawn bodily, as will be understood by reference to Fig. 4. Then, the bottom board 4 is lifted vertically high enough to free the fixed core 1, which is carried to any place desired.

An important or special feature of my invention is the construction and combination of parts whereby I provide for convenient application, support, and detachment of the bonds or ties 12 of the molded block. The end edges of the fixed core 1 are inclined inward from the bottom up and constructed stepwise, that is to say, with a series of transverse shoulders corresponding to the number of bonds or ties 12 employed. The inner ends of the detachable cores 2 are similarly constructed stepwise, or with shoulders, as shown in Fig. 4, but in the reverse order; that is to say, the inner ends of the cores 2 being inclined inward from the top downward so as to correspond with the inclines and shoulders of the fixed core 1; thus, when the detachable cores 2 are set in place on the bottom 4, as shown in Figs. 1 and 4, the ends of the core sections 1 and 2 abut, leaving, however, a sufficient space between the shoulders for reception of bonds or ties 12. By this means, the latter are held in the required position within the mold-box, and, the cement being poured in and duly tamped, the bonds 12 become firmly embedded in the two side portions of the block, as will be readily understood. When the molded block has dried and hardened sufficiently to retain its form, the side and end portions of the mold-box are removed, as already described, leaving the block in place on the bottom 4, which being then lifted, it is apparent that the bonds 12, owing to the incline of the ends of the fixed core 1 on which they are supported, pass upward without obstruction, and thus are freed from such core. It will thus be seen that the inclination of the ends of the fixed core constitute an important feature in this operation of my invention.

What I claim is:—

In an apparatus for the purpose specified, the combination with a suitable base having a fixed vertical core constructed for support of block bonds, and a mold-box comprising removable sides and ends, the latter having removable core sections whose inner ends are inclined corresponding to the fixed core section and adapted to assist in holding the block bonds in place during the molding operation, substantially as described.

JAMES I. TAYLOR.

Witnesses:
   ELIAS DUNKEL,
   F. R. CREGLOW.